Nov. 7, 1933.  S. J. BOUGHTON ET AL  1,934,222
AUTOMOTIVE VEHICLE BRAKE
Original Filed Aug. 10, 1926
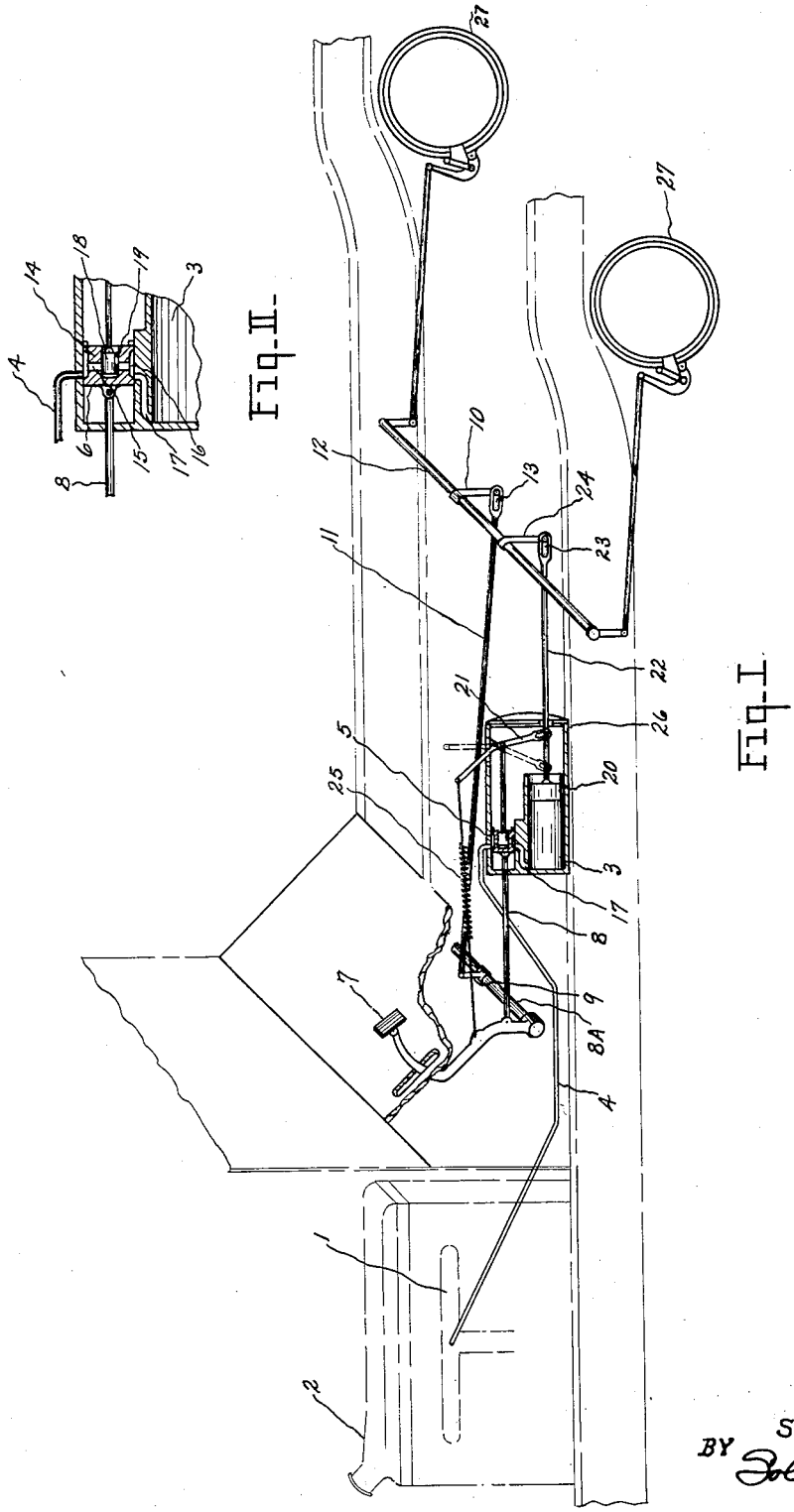
INVENTORS
WARREN T. HUNT
SOLON J. BOUGHTON
BY
ATTORNEY Patented Nov. 7, 1933

1,934,222

UNITED STATES PATENT OFFICE 1,934,222

AUTOMOTIVE VEHICLE BRAKE

Solon J. Boughton, Cleveland, Ohio, and Warren T. Hunt, East Orange, N. J., assignors to The Willys Overland Company, Toledo, Ohio, a corporation of Ohio Application August 10, 1926, Serial No. 128,419
Renewed June 3, 1932

11 Claims. (Cl. 188—152)

This invention relates to automotive vehicle brakes and more particularly to automotive vehicle brakes of the servo type.

One of the objects of the invention is to provide a servo brake in which the force required to control the brake, rapidly increases with the degree of brake application.

Another object of the invention is to provide an automotive vehicle with a brake that may be operated by either mechanical or manual means.

Another object of the invention is to provide a combined servo and manually operated brake in which the manual actuation of the brake may be accomplished with little physical effort.

Another object of the invention is to provide a servo and a manually operated brake that have a common actuating pedal in which the pedal retracting spring is deflected to a greater extent during the servo operation than during the manual operation.

Other objects will appear from the description to follow, in connection with which for the purposes of the present application, we have illustrated one embodiment of the invention in the accompanying drawing, in which Figure I is a perspective view of the brake operating mechanism, in which the related parts of an automotive vehicle are shown in broken lines.

Fig. II is an enlarged view of the control valve of the vacuum servo brake.

Servo brake actuators are well known in the art, and are widely used because of the ease with which the brakes may be applied, especially on heavy vehicles, which require high pedal pressures to secure the desired braking effect. Prior to this invention, in designing servo brakes it has been customary to use a pedal retracting spring that is fixed to the vehicle, and to select a spring that will resist the pedal movement with approximately one-half the force required to operate the brakes by manual effort. Such a spring is much heavier than the ordinary retracting spring used with manual brakes, but it is very satisfactory for servo use, as the force necessary to depress the pedal is less than that necessary for the usual manual operation, but is still great enough to enable the vehicle operator to realize the extent of the brake application. However, it is desirable to provide a means for manually operating the brakes subsequent to a failure of the servo mechanism and if it should become necessary to apply the brakes manually, the heavy retracting spring becomes a disadvantage, in that the operator has to overcome the heavy retracting spring in addition to applying the required braking force.

The present invention overcomes the above troubles by a spring arrangement, hereinafter described, that permits the same retracting spring to exert a greater force during the servo operation than during the manual operation.

Referring to the drawing, in which like characters are applied to like parts throughout the views, we have shown a vacuum servo brake, which type is particularly adaptable to the invention, although any desired type of servo may be used. The manifold 1 of engine 2 is connected to the servo brake cylinder 3 by pipe 4 through a valve 5 having a piston 6 connected to pedal 7 by rod 8. Pedal 7 and integral shaft 8A are pivotally mounted on the vehicle in the usual manner, and shaft 8A is provided with a short lever 9 operatively connected to an arm or lever 10 on the brake rocker shaft 12 by rod 11. Lever 10 is fixed on rock shaft 12 and the lower portion of the lever 10 is movable within a slot 13 formed in the end of rod 11, which may be described as a loose link connection commonly used to connect one brake system with two separate actuating levers.

The vacuum brake illustrated is controlled by the valve 5 having an outer piston 14 provided with a cross passage 15 and an annular external groove 16 which is adapted to coincide with pipe 4 and the passage 17 in all operative positions of piston 14. An inner piston 18, slidably mounted in the outer piston 14, is adapted to close passage 15 when in the extreme left position and provide communication between the brake cylinder 3 and the surrounding atmosphere, a groove 19 being provided for this purpose which communicates with the lower portion of passage 15, as shown in Fig. II. The inner piston 18 is connected to the brake operating piston 20 by a lever 21 pivotally mounted on the brake housing and operatively connected to both the servo operating rod 22 and the inner piston 18 in a manner to move the inner piston into a position to block passage 15 when the servo piston 20 moves to operate the brakes. Operating rod 22 is provided with a slot 23 in which slides the lower end of lever 24 fixed to rock shaft 12, the manner of connection to the rock shaft being similar to that used for connecting the rock shaft to the manually actuated rod 11.

A retracting spring 25 has one end connected to pedal 7 and the opposite end to an extension of lever 21 the arrangement of the connections being such as to increase the tension of spring 110

25 when the piston 20 moves to actuate the brakes. A stop should be provided for lever 21 to prevent piston 20 being pulled out of the cylinder 3 by the action of spring 25. In the present embodiment, the housing 26 acts as a stop for lever 21 and prevents the spring 25 from moving the lever beyond the full line position of Fig. I. We prefer to construct the separate arms of lever 21 at an angle to each other and to incline the spring attaching arm toward the pedal in the inoperative position, and to so arrange the lever that the arm will form substantially a right angle with the spring in the extreme left position of piston 20, as shown by the broken line position of the lever in Fig. I. The above mentioned arrangement of the lever provides a means for increasing the spring tension at an accelerated rate, which has been found desirable for indicating the extent of brake application to the vehicle operator.

In the normal operation of the vehicle, a vacuum is present in the manifold 1 which may be transmitted to the brake cylinder 3 by a depression of the foot pedal 7. A slight downward movement of the pedal 7 deflects spring 25 and moves outer piston 14 toward the left as shown in the drawing. Inner piston 18 during the initial movement, remains stationary until the passages 15 are uncovered and piston 20 is moved to the left by the atmospheric pressure exerted on its outer side. Piston 20 by its operative connection to rock shaft 12 rotates the same and operates brake bands 27 which contact with some moving part of the vehicle (not shown) in the usual manner. The movement of piston 20 and the resultant vehicle braking action is governed by the amount of depression of the pedal 7, as inner valve piston 18 is moved forward until passage 15 is again closed. A further downward movement of the pedal increases the movement of the piston in the same direction but an upward movement permits the outer piston to move to the right in response to the pull of spring 25 a sufficient distance to relieve the vacuum within the cylinder by the admission of air through groove 19, passage 15, groove 16, and passage 17 and permits the piston 20 to be retracted by the spring 25.

Spring 25, which preferably has a deflection rate substantially the same as the usual retracting spring for manual brake operating pedals, is deflected during servo operation both by pedal 7 and piston 20 and consequently the force exerted by the spring is greater than if one end of spring 25 were fixed to the vehicle in the ordinary manner.

Lever 10 during the operation of the servo brake swings within slot 13 in the rod 11, but if the servo mechanism should fail, rod 11 will positively actuate the rock shaft 12 and lever 24 will swing within slot 23, of rod 22. In the manual operation of the brakes subsequent to a failure of the servo actuating means, piston 20 will remain immovable, lever 21 will be against the casing 26 and spring 25 will be deflected by pedal movement only, the retractive force of the spring being the same as the usual fixedly anchored spring.

From the above description it may be readily seen that we have provided a combined servo and manually operated braking means, that is operable by a pedal having a retracting spring that will give different retracting forces to the pedal. The force rate of the spring is fixed by the design and material used, but the total force exerted is dependent on the deflection. The present invention has provided a means for deflecting the spring a greater distance with the servo than with the manual operating means and thereby proportionately increases the retractive force during the operation of the servo brake.

While we have illustrated and described somewhat in detail one embodiment of the invention, it is to be understood that this showing and description are illustrative only and that we do not regard the invention as limited to the details of construction shown and described except insofar as we have included such limitations within the terms of the following claims:

We claim:

1. In an automotive vehicle brake having both servo and manual means for actuating the same, the combination of a manually operable member for controlling said servo means and actuating said manual means, a spring for retracting said member and operatively connected thereto, and a lever pivotally connected to the vehicle and operatively connected to said spring and said servo means respectively, whereby the operation of said servo means increases the retractive force of said spring.

2. In an automotive vehicle brake having both servo and manual means for actuating the same, the combination of a pedal adapted to control said servo means and to actuate said manual means, a loose link connection between said pedal and said manual means, a second loose link connection between said manual means and said servo means for permitting independent actuation of the brake by each of said means, and a retracting spring operatively connected to said pedal and a movable part of said servo means, said movable part being adapted to increase the retractive force of said spring when the servo means is operated.

3. In an automotive vehicle brake having both servo and manual means for actuating the same, the combination of a pedal for controlling said servo means and actuating said manual means, a spring operatively connected to said pedal, and a lever pivotally mounted on said vehicle and having arms operatively connected to said spring and servo means respectively, and the spring arm of said lever having an oblique relation to the servo arm, and said lever arranged with the spring arm inclined toward the pedal connection of said spring, whereby the rate of deflection of said spring is accelerated when the lever is moved.

4. In an automotive vehicle brake having both fluid pressure and manual means for actuating the same, the combination of a cylinder, a brake actuating piston therein, a valve for controlling the pressure within said cylinder, a pedal operatively connected to said valve and having a loose link operative connection to said manual means, a spring operatively connected to said pedal for retracting the same, and means operatively connected to said piston and said spring whereby movement of said piston increases the retractive force of said spring.

5. In an automotive vehicle brake having both servo and manual means for actuating the same, said servo means comprising a cylinder and a fluid pressure operated piston therein, the combination of a valve for controlling pressure to said cylinder, a pedal operatively connected to said valve and having a loose link connection to said manual actuating means, a member operatively connected to said piston, and resilient means operatively connected to both said member and said pedal for returning said pedal to an inoperative position, said member being arranged to increase the force of said spring and urge it toward the inoperative position when said piston is moved to actuate the brake.

6. In combination with an automotive vehicle having an engine, a vacuum servo brake actuating means having a connection to the intake manifold of said engine, a valve for controlling the vacuum connection to said servo means, manual brake actuating means, said servo and manual means being interconnected by loose link connections for permitting independent brake actuation by each of said means, a pedal operatively connected to said control valve and said manual means, and a retracting spring connected to said pedal and said servo means whereby the retractive force of said spring is increased by the operative movement of the servo brake.

7. In a braking system for an automotive vehicle, a servo brake actuating means, a manual brake actuating means, a pedal adapted to control said servo means and directly operate said manual means, a retracting spring for said pedal having a connection to said servo actuating means and adapted to be deflected by both said pedal and said servo means, and a stop for resisting bodily motion of said spring when the servo brake is inoperative.

8. In a braking system for an automotive vehicle, a servo actuating means, a manual actuating means, a pedal adapted to control the servo means and directly operate the manual means, a retracting spring for said pedal having its ends connected to said pedal and a movable part of said servo means respectively, means for simultaneously deflecting said spring from opposite ends when the servo means is operative, and means for limiting the movement of the servo end and permitting the deflection of said spring at the pedal end when the servo means is inoperative.

9. In a fluid pressure operated vehicle brake comprising a cylinder having a movable piston for actuating the brake, the combination of a valve for controlling pressure existing within said cylinder, a pedal operatively connected to said valve having limited movement relative to said piston and a spring having its ends operatively connected respectively to both said piston and said pedal, whereby the spring simultaneously urges said piston and said pedal to their respective inoperative positions and the movement of either piston or pedal increases the spring tension therebetween.

10. In a braking system for a vehicle a servo actuating means comprising a pull rod, a manual actuating means, a pedal for controlling the servo means and directly operating the manual means, an arm operatively conected to said pull rod and arranged to have a portion move oppositely to the movement of a portion of said pedal, and a spring having its ends operatively connected to the oppositely moving portions of said pedal and said arm.

11. In an automotive vehicle braking system a servo actuating means, a manual actuating means, a pedal acting as a control for said servo means and adapted to directly operate said manual means, a retracting spring connected to said pedal and a movable part of one of said actuating means, and means for simultaneously deflecting said spring from two points when one of said systems is operated, and from a single point when the other is operated.

SOLON J. BOUGHTON.
WARREN T. HUNT.